United States Patent [19]

Gondar

[11] Patent Number: 5,762,691
[45] Date of Patent: Jun. 9, 1998

[54] AERODYNAMIC-ELECTROSTATIC PARTICULATE COLLECTION SYSTEM

[75] Inventor: Robert K. Gondar, Monroe, Conn.

[73] Assignee: Sikorsky Aircraft Corporation, Stratford, Conn.

[21] Appl. No.: 407,748

[22] Filed: Mar. 21, 1995

[51] Int. Cl.$^6$ ........................................ B03C 3/36
[52] U.S. Cl. .................... 96/60; 55/385.5; 96/63
[58] Field of Search ........................ 96/60–63, 94, 96/98, 97; 95/78; 15/1.51, 1.52; 55/DIG. 3, 385.5

[56] References Cited

U.S. PATENT DOCUMENTS

| | | | |
|---|---|---|---|
| 2,307,602 | 1/1943 | Penney et al. | 73/863.21 |
| 2,931,458 | 4/1960 | Vane | 96/61 X |
| 3,395,042 | 7/1968 | Herbert, Jr. | 15/1.51 X |
| 3,443,362 | 5/1969 | Ebert | 96/61 X |
| 3,478,494 | 11/1969 | Lustenader et al. | 96/61 |
| 3,513,635 | 5/1970 | Eishold et al. | 96/99 |
| 3,915,676 | 10/1975 | Reed et al. | 55/432 X |
| 3,994,704 | 11/1976 | Shubuya et al. | 96/60 |
| 4,119,415 | 10/1978 | Hayashi et al. | 96/60 |
| 4,147,522 | 4/1979 | Gonas et al. | 55/467 X |
| 4,248,162 | 2/1981 | Skeist | 108/50 |
| 4,509,958 | 4/1985 | Masuda et al. | 55/521 X |
| 4,662,903 | 5/1987 | Yanagawa | 96/59 |
| 4,715,870 | 12/1987 | Masuda et al. | 96/67 |
| 4,941,224 | 7/1990 | Saeki et al. | 15/1.51 |
| 5,125,124 | 6/1992 | Saeki et al. | 15/1.51 |
| 5,215,558 | 6/1993 | Moon | 96/62 |
| 5,231,622 | 7/1993 | Hayashi | 15/1.51 X |
| 5,277,703 | 1/1994 | Sklenak et al. | 96/94 X |

FOREIGN PATENT DOCUMENTS

| | | | |
|---|---|---|---|
| 60-129114 | 7/1985 | Japan | 96/60 |
| 62-002844 | 1/1987 | Japan | 96/60 |
| 62-097650 | 5/1987 | Japan . | |
| 63-283768 | 11/1988 | Japan . | |
| 072006447 | 8/1973 | Netherlands . | |
| 000912218 | 3/1982 | U.S.S.R. | 96/60 |
| 000929224 | 5/1982 | U.S.S.R. | 96/60 |

*Primary Examiner*—Richard L. Chiesa
*Attorney, Agent, or Firm*—Terrance J. Radke

[57] ABSTRACT

An aerodynamic-electrostatic particulate collection system for high-efficiency collection of particulate debris generated in a machining area during machining of a workpiece, especially post-cure machining of a composite workpiece, that includes a vacuum subsystem for generating a localized, vacuum-induced aerodynamic fluid flow field in the machining area and a particulate charging, electric field generating subsystem integrated in combination with the workpiece and the vacuum subsystem for charging particulate debris generated during machining of the workpiece and for creating an electric field that directs the charged particulate debris into the localized, vacuum-induced aerodynamic fluid flow field. The vacuum subsystem includes a vacuum pump, a hose fluidically interconnected to the vacuum pump, and a nozzle fluidically connected to the hose distal the vacuum pump and having a configuration that defines the localized, vacuum-induced aerodynamic fluid flow field. The particulate charging, electric field generating subsystem includes a high voltage power supply, a first conductive lead electrically interconnecting the high voltage power supply and the workpiece, a collection electrode physically integrated in combination with the nozzle, and a second conductive lead electrically interconnecting the high voltage power supply and the collection electrode. The oppositely charged workpiece and collection electrode in combination produce a corona discharge in the machining area that causes the particulate debris generated during machining of the workpiece to be charged. Further, the oppositely charged workpiece and collection electrode in combination create the electric field that is collinear with the localized, vacuum-induced aerodynamic fluid flow field.

9 Claims, 3 Drawing Sheets

AERODYNAMIC-ELECTROSTATIC PARTICULATE COLLECTION SYSTEM

TECHNICAL FIELD

The present invention relates to particulate collection systems, and more particularly, to an aerodynamic-electrostatic particulate collection system that utilizes aerodynamic and electrostatic forces in combination to efficaciously collect particulate debris generated during the machining of articles, particularly composite articles.

BACKGROUND OF THE INVENTION

The widespread utilization of composite materials such as graphite and KEVLAR® (KEVLAR is a registered trademark of E. I. du Pont de Nemours & Co., Wilmington, Del. for an aromatic polyamide fiber of high tensile strength) embedded in a resinous matrix, e.g., epoxy, has become commonplace in the aerospace industry due to the high strength-to-weight ratio of such composite materials. Even though composite materials are formed into composite articles in the main by various molding processes, e.g., resin transfer molding, vacuum bag molding using prepreg composite materials, composite articles are generally subjected to standard post-cure machining practices such as drilling, routing, milling, and/or diamond wheel cutting to form the composite articles to net shape and/or to prepare the composite articles for integration with other articles.

Due to the brittle nature of some of the constituents elements used to form composite materials, e.g., graphite or KEVLAR® fibers, post-cure machining of composite articles often results in the generation of particulate debris, e.g., relatively fine particles less than 5 microns in size down to sub-micron sizes, i.e., dust, as well as larger fiber particles, i.e., greater than 5 microns in size up to several millimeters in size. Such particulate debris raises health concerns, i.e., respiration potential, for personnel working in areas where post-curing machining of composite articles is being undertaken as well concerns vis-a-vis contamination of post-cure machining tools, bearings, spindles, control electronics associated with automated machining tools, and aircraft avionics. The problems associated with the control and disposal of particulate debris arising from post-cure machining of composite articles differs from the problems arising out of the machining of metallic articles, which are generally more ductile than composite materials, thereby tending to form larger-sized particulate debris which is more readily controlled and disposed of.

Several techniques are currently used to alleviate the problems arising as a result of the particulate debris generated during the post-cure machining of composite articles. These techniques include coolant flooding, localized vacuum dust removal, and downdraft benches/booths.

In the coolant flooding technique, a specialized liquid, typically water containing anti-corrosive additives, is directed at the composite article during the machining process to entrain the generated particulate debris in solution. The coolant flooding technique is advantageous inasmuch as the coolant fluid lowers the operating temperature of the machining tool, thereby extending the useful lifetime of the tool. One disadvantage of this technique is the relatively high risk of composite article contamination. If the composite article includes stiffeners such as cores or foam, such stiffeners are subject to contamination if subjected to the coolant fluid. Vacuum fixtures used to hold the composite article during the machining process may draw the coolant fluid into contact with porous plies comprising the composite article. In addition to the foregoing disadvantage, the particulate debris solution produced as a result of the coolant flooding technique must be treated prior to disposal, typically by filtering using a cartridge-type filter or a paper roller filter, either of which require a high level of maintenance. Even with coolant flooding, a residual film of particulate debris usually remains on the composite article. This residue must be removed from the composite article using air pressure and absorbent materials. Finally, the coolant flooding technique obstructs the view of the composite article during the machining process to a degree. Overall, the coolant flooding technique is relatively costly and inflexible.

The localized vacuum debris removal technique utilizes hoses and a pickup head proximal the machine tooling or composite workpiece to create a localized aerodynamic fluid flow field that directs particulate debris into the pickup head for subsequent disposal. The localized vacuum debris removal technique does not utilize liquid coolants, thereby eliminating the possibility of workpiece contamination. The vacuum hoses and pickup head, however, are mounted directly in combination with the machining tool, and such a mounting arrangement is cumbersome and often obstructs the operator's view of the machining tool. Furthermore, this type of mounting arrangement may not be conducive to post-cure machining of composite articles having intricate or complex shapes. In addition, the localized vacuum debris removal technique is relatively inefficient over the wide size range of particulate debris inasmuch as the size of the hose and pickup head are limited due to the requirement to mount these components in combination with the tool.

In the downdraft bench/booth technique, the workpiece to be post-cure machined is mounted in the bench/booth so that a localized aerodynamic fluid flow field is directed down over the workpiece such that particulate debris generated during machining is directed downwardly away from the workpiece. This technique is not subject to ply contamination, and does not require that attachment of bulky components directly in combination with the machining tool. The downdraft technique, however, is less efficient than the localized vacuum dust removal technique such that there is a higher risk that a machine operator will be exposed to particulate debris. Moreover, this technique is even less conducive than the localized vacuum dust removal technique to post-cure machining of composite articles having intricate or complex shapes.

The use of electrostatic technology for particle control is well known in the prior art. Representative examples of the use of such electrostatic technology includes U.S. Pat. Nos. 5,215,558, 5,125,124, 4,941,224, 4,715,870, 4,662,903, 4,509,958, 4,248,162, 4,147,522, 4,119,415, 3,994,704, 3,915,676, 3,513,635, and 2,307,602. Japanese documents JP363283768, JP362097650, JP362002844, and JP360129114, Soviet Union documents SU000929224 and SU00912218, and Netherlands document NL072006447. In general, the use of such electrostatic technology for particle control involves the use of electrostatic collectors to remove charged dust particles from an air stream. This is accomplished by subjecting the dust-laden air stream to an electric field to cause the dust particles therein to be charged. The charged, dust-laden air stream is then subjected to an oppositely-charged element wherein the charged dust particles are removed from the charged, dust-laden air stream.

A need exists to provide a system for collecting particulate debris generated during machining of articles, particularly post-cure machining of composite articles that utilizes aerodynamic and electrostatic forces in combination to provide high-efficiency collection of the particulate debris. The system should include a means for creating a localized, vacuum-induced aerodynamic fluid flow field in the article machining area. The system should also include a means for charging the particulate debris generated during machining of the article. Further, the system should include a means for creating an electric field that is collinear with the localized, vacuum-induced aerodynamic fluid flow field.

DISCLOSURE OF THE INVENTION

One object of the present invention is to provide an aerodynamic-electrostatic particulate collection system that utilizes aerodynamic and electrostatic forces in combination to provide high-efficiency collection of particulate debris generated during machining of workpieces, especially post-cure machining of composite workpieces.

Another object of the present invention is to provide an aerodynamic-electrostatic particulate collection system that is operative to create a localized, vacuum-induced aerodynamic fluid flow field in the machining area of the workpiece being machined.

A further object of the present invention is to provide an aerodynamic-electrostatic particulate collection system that is operative to charge the particulate debris in the machining area generated during the machining of the workpiece.

Yet one more object of the present invention is to provide an aerodynamic-electrostatic particulate collection system that is operative to generate an electric field that is collinear with the localized, vacuum-induced aerodynamic fluid flow field such that the charged particulate debris is directed into the localized, vacuum-induced aerodynamic fluid flow field.

These and other objects are provided by an aerodynamic-electrostatic particulate collection (AEPC) system according to the present invention that is operative for high-efficiency collection of particulate debris generated in a machining area during machining of a workpiece, especially a composite workpiece. The AEPC system comprises a vacuum subsystem that is operative to generate a localized, vacuum-induced aerodynamic fluid flow field in the machining area and a particulate charging, electric field generating subsystem integrated in combination with the workpiece and the vacuum subsystem for charging particulate debris generated during machining of the workpiece and for creating an electric field that directs the charged particulate debris into the localized, vacuum-induced aerodynamic fluid flow field.

The vacuum subsystem includes a vacuum pump, a hose fluidically interconnected to the vacuum pump, and a nozzle fluidically connected to the hose distal the vacuum pump. The nozzle is positioned with respect to the workpiece and has a configuration that defines the localized, vacuum-induced aerodynamic fluid flow field.

The particulate charging, electric field generating subsystem includes a high voltage power supply, a first conductive lead electrically interconnecting the high voltage power supply and the workpiece, a collection electrode physically integrated in combination with the nozzle, and a second conductive lead electrically interconnecting the high voltage power supply and the collection electrode. The oppositely charged workpiece and collection electrode in combination produce a corona discharge in the machining area that causes the particulate debris generated during machining of the workpiece to be charged. Further, the oppositely charged workpiece and collection electrode in combination create the electric field that is collinear with the localized, vacuum-induced aerodynamic fluid flow field. The collinearity between the localized, vacuum-induced aerodynamic fluid flow field and the electric field provides the high-efficiency collection of the aerodynamic-electrostatic particulate collection system.

BRIEF DESCRIPTION OF THE DRAWINGS

A more complete understanding of the present invention and the attendant features and advantages thereof may be had by reference to the following detailed description when considered in conjunction with the accompanying drawings wherein.

BEST MODES FOR CARRYING OUT THE INVENTION

Figure 1:
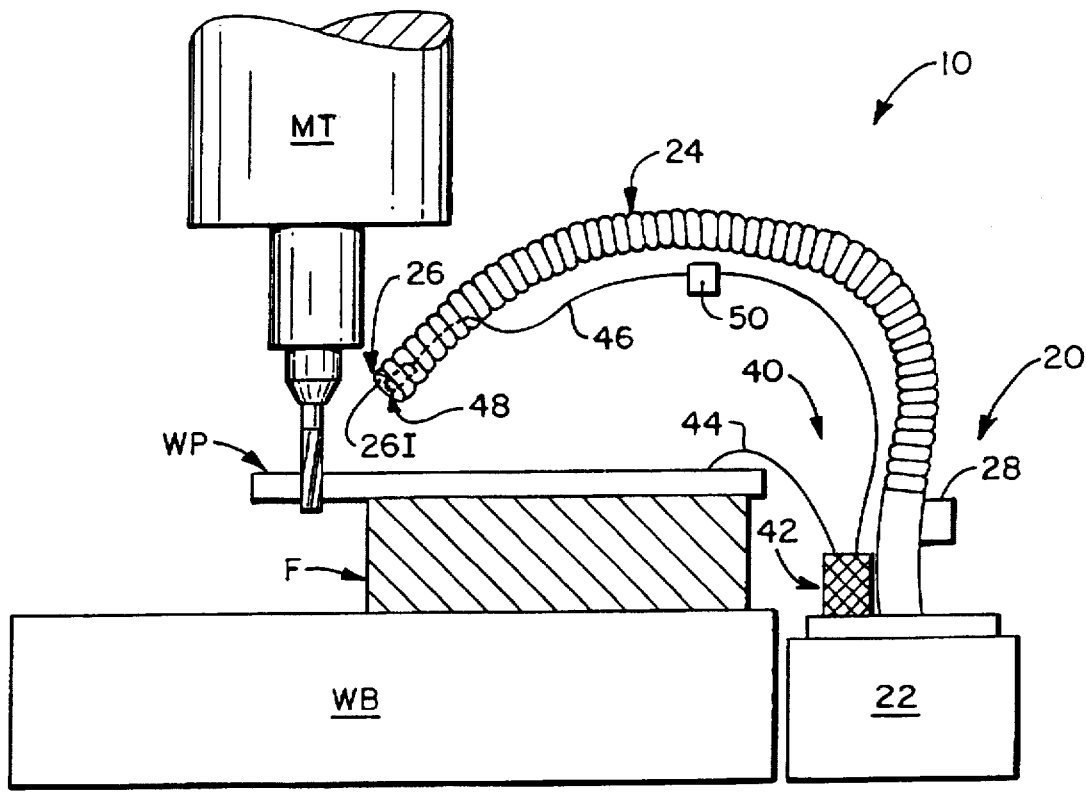
FIG. 1 is an exemplary embodiment of an aerodynamic-electrostatic particulate collection (AEPC) system according to the present invention.

Referring now to the drawings wherein like reference numerals identify corresponding or similar elements throughout the several views, FIG. 1 illustrates an exemplary embodiment of an aerodynamic-electrostatic particulate collection (AEPC) system 10 according to the present invention. A workpiece WP to be post-cure machined is mounted on a workbench WB by means of a fixture F and positioned for machining by means of a machine tool MT (as illustrated, a drill for routing apertures in the workpiece WP). As one skilled in the art will appreciate from the ensuing disclosure, the AEPC system 10 according to the present invention has utility for post-cure machining operations involving workpieces WP which are conductive, and in particular, composite conductive workpieces WP. The AEPC system 10 has particular utility for enhanced particulate debris collection during post-cure machining operations involving graphite or KEVLAR® composite articles, but may be used in combination with other composite articles that are conductive or with other types of articles that are conductive.

The AEPC system 10 of the present invention utilizes electrostatic and aerodynamic-vacuum technologies in integrated combination to significantly improve the collection of particulate debris generated during post-cure machining of workpieces WP. The AEPC system 10 includes a vacuum subsystem 20 and a particulate charging, electric field generating (pc-efg) means 40. The vacuum subsystem 20 is operative to generate a localized vacuum-induced aerodynamic fluid flow field in the vicinity of the workpiece WP machining area that removes particulate debris generated by post-cure machining of the workpiece WP from the machining area. The pc-efg means 40 is integrated in combination with the vacuum subsystem 20 and is operative: (i) to charge the particulate debris emitted from the workpiece WP during post-cure machining thereof, and (ii) to create an electric field that directs the charged particulate debris into the localized aerodynamic fluid flow field. The electric force field generated by the pc-efg means 40 is utilized to enhance the particulate debris collection efficiency of the vacuum subsystem 20, i.e., the percentage of particulate debris entrained in the aerodynamic fluid flow field is significantly increased.

Electrostatic particulate debris collection takes place through two mechanisms: (i) corona charging of particulate debris generated during post-cure machining of the workpiece WP; and (ii) electric field transport of the charged particulate debris. The particulate debris generated as a result of workpiece WP machining operations is charged as a result of the free electrons produced in the electric corona generated by the pc-efg means 40. The strong electric field strips away electrons from gas molecules, leaving positive gas ions, which migrate from the corona region. Particulate debris in the vicinity of the workpiece WP is charged by the free electrons. The electric field developed by the pc-efg means 40 directs the charged particulate debris into the localized aerodynamic fluid flow field generated by the vacuum subsystem 20. The electrostatic forces acting on the particulate debris are functions of the particulate size, mass, strength of the collection field, and residence time in the corona region.

The vacuum subsystem 20 includes a vacuum pump 22, a hose 24, a nozzle 26 at the end of the hose 24 distal the vacuum pump 22, and a filtration device 28 integrated in combination with the vacuum subsystem 20 (with the hose 24 in the illustrated embodiment, or alternatively, with the vacuum pump 22). The nozzle 26 is configured: (i) to develop the localized vacuum-induced aerodynamic fluid flow field in the machining area immediately adjacent the workpiece WP; and (ii) to facilitate mounting of the electrode of the pc-efg means (40) in combination therewith (see specific embodiments described hereinbelow). In addition, for operator-wielded machining tools, the nozzle 26 is configured: (i) for mounting in combination with the machining tool; and (ii) to minimize the visual obstructive effects thereof so that the workpiece WP is readily visible to the operator during post-cure machining operations. These latter design criteria may or may not be required for NC or automated machining tools. The filtration device 28 is any of the filtration mechanisms conventionally used to remove particulate debris from a gaseous fluid flow field system and is operative to remove particulate debris entrained in the aerodynamic fluid flow field transmitted through the vacuum subsystem 20, thereby ensuring that the operation of the vacuum pump 22 is not degraded due to the ingestion of particulate debris.

The pc-efg means 40 comprises a high voltage power supply 42, a first conductive lead 44, a second conductive lead 46, a collection electrode 48, and a current interrupter device 50. The high voltage power supply 42 is any conventional high energy D.C. power supply that is operative to produce a high voltage (e.g., a range of about 12 kV to about 20 kV) at very low amperes (e.g., a range of about 400 microamps to about 1800 microamps). The first conductive lead 44 electrically interconnects the high voltage power supply 42 to the workpiece WP. The collection electrode 48 is integrated in combination with the nozzle 26 adjacent the inlet 261 thereof. The collection electrode 48 may be mounted as a separate element in combination with the nozzle inlet 261 (as illustrated in FIGS. 1 or 3) or may be fabricated as part of the structure defining the nozzle inlet 261 (see FIGS. 2 or 4). The second conductive lead 46 electrically interconnects the high voltage power supply 42 to the collection electrode 48.

With the high voltage power supply 42 activated, the oppositely charged workpiece WP and collection electrode 48 in combination produce a corona discharge in the machining area that causes the particulate debris generated during post-cure machining of the workpiece WP to become negatively charged. Concomitantly, the oppositely charged workpiece WP and the collection electrode 48 in combination create an electric force field therebetween that causes the negatively charged particulate debris to be transported towards the collection electrode 48.

Since the collection electrode 48 is integrated in combination with the nozzle inlet 261, the electric force field generated by the pc-efg means 40 is collinear with the aerodynamic fluid flow field generated by the vacuum subsystem 20. The collinearity of the electric and aerodynamic fields generated by the AEPC system 10 according to the present invention significantly enhances the particulate debris collection efficiency thereof.

The workpiece WP should be electrically interconnected to the high voltage power supply 42 so as to be at ground potential. This precludes any arcing between the workpiece WP and the machining tool MT during post-cure machining operations. The current interrupter device 50 (shown in FIG. 1 as mounted in combination with the second conductive lead 46) is operative to momentarily de-energize the collection electrode 48 during operation of the AEPC system 10. During operation of the AEPC system 10, negatively charged particulate debris is electrostatically attracted to and accumulates on the collection electrode 48. An excessive accumulation of negatively charged particulate debris on the collection electrode 48 impairs the collection efficiency of the AEPC system 10 by weakening the electric force field and obstructing the aerodynamic fluid flow field into the nozzle 26. Operation of the current interrupter device 50 momentarily negates the electrostatic attraction force exerted by the collection electrode 48 so that the charged particulate debris that has electrostatically accumulated on the collection electrode 48 can be effectively dislodged therefrom by the aerodynamic fluid flow field through the inlet 261 of the nozzle 26 and transmitted through the hose 24 to the filtration device 28. The frequency of de-energization is such as to ensure that the efficiency of the collection electrode 48 is not markedly affected by the build-up of negatively charged particle debris electrostatically collected on the collection electrode 48. The interrupter means 50 may be any conventional circuit or device that performs the described function.

Figure 2:
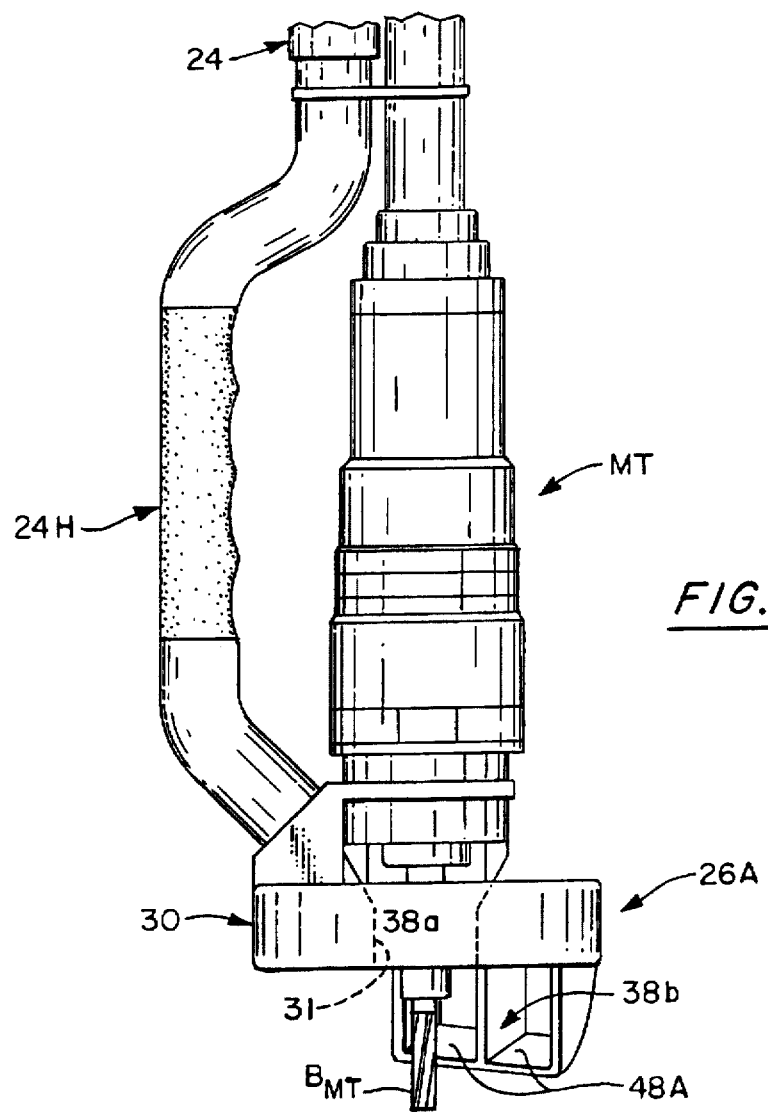
FIG. 2 is an embodiment of the AEPC system according to the present invention depicting a detailed perspective view of the nozzle configuration of the vacuum subsystem.
Figure 2A:
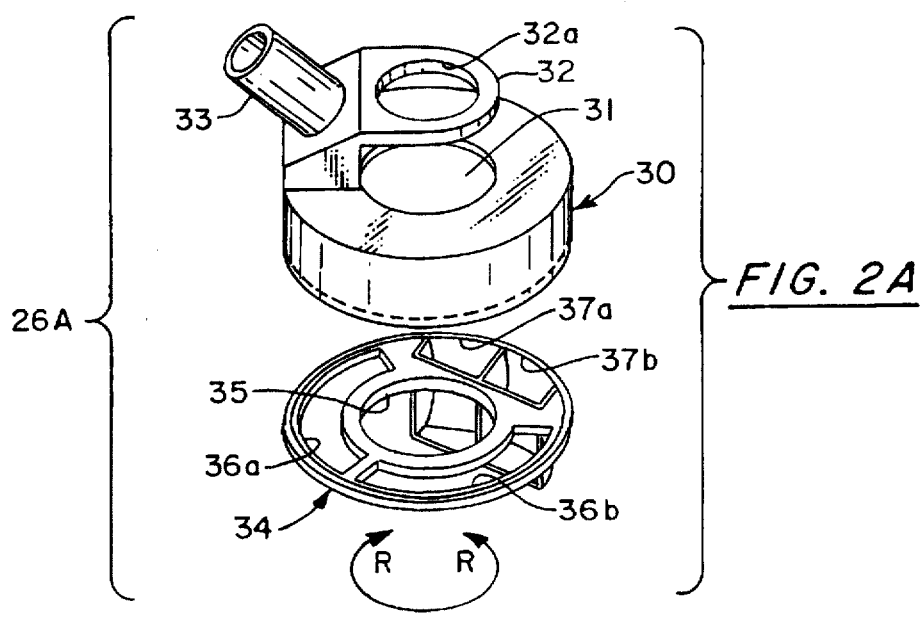
FIG. 2A is an exploded perspective view of the nozzle configuration of FIG. 2.
Figure 3:
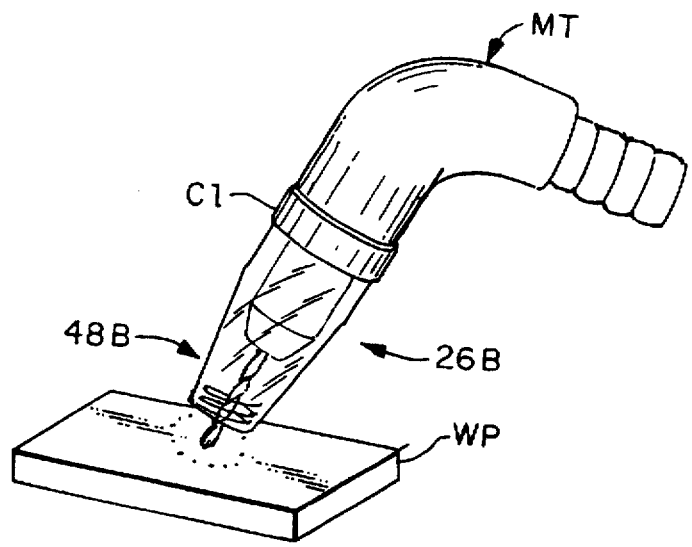
FIG. 3 illustrates another embodiment of a nozzle configuration for the AEPC system according to the present invention.

FIGS. 2, 2A illustrate one embodiment of a nozzle 26A for the vacuum subsystem 20 of the AEPC system 10 according to the present invention. The nozzle 26A is configured for mounting in combination with a hand-held machine tool MT (as illustrated, a router that includes a bit $B_{MT}$ for machining apertures, etc., in the workpiece WP). The nozzle 26A includes a nozzle body 30 and a plate 34 mounted in rotatable combination with the nozzle body 30. The nozzle body 30 has a cylindrical configuration that defines an internal channel 31 and includes an apertured attachment flange 32 and an extension member 33. The internal channel 31 has a tapered configuration (see FIG. 2) that facilitates development of the localized vacuum-induced aerodynamic fluid flow field in the machining area of the workpiece WP. The apertured attachment flange 32 is operative for mounting the nozzle 26A in combination with the machine tool MT by means of the aperture 32a therethrough. The extension member 33 is operative to fluidically interconnect the nozzle 26A to the hose 24 (note that part of the hose 24 is formed as a handle 24H for operator convenience). As illustrated in FIG. 2A, the second conductive wire 46 is routed through the extension member 33 (and the vacuum hose 24) for safety.

The plate 34 includes a central aperture 35, first and second arcuate apertures 36a, 36b, and first and second duct apertures 37a, 37b. A pair of ducts 38a, 38b, which are in fluidic communication with the first and second duct apertures 37a, 37b, respectively, extend downwardly from the plate 34. In this embodiment of the nozzle 26A, the collection electrode 48A is part of the structure defining the ducts 38a, 38b. More specifically, the collection electrode 48A is formed by plating a conductive material, e.g., copper, onto the internal surfaces of the walls defining the ducts 38a, 38b. The second conductive lead 46 is electrically interconnected to the collection electrode 48A.

The internal channel 31, the aperture 32a, and the central aperture 35 of the nozzle 26A in combination allow the bit $B_{MT}$ to extend through the nozzle 26A for interaction with the workpiece WP. The ducts 38a, 38b extend downwardly proximal the bit $B_{MT}$ while allowing sufficient clearance for the bit $B_{MT}$ to penetrate the workpiece WP. The configuration of the ducts 38a, 38b define the nozzle inlet for the nozzle 26A which creates the primary vacuum-induced aerodynamic fluid flow field in the machining area adjacent the workpiece WP, this primary aerodynamic fluid flow field being collinear with the electric field generated between the workpiece WP and the collection electrode 48A. The first and second arcuate apertures 36a, 36b create a secondary vacuum-induced fluid flow field in the machining area. The aerodynamic fluid flow field through the ducts 38a, 38b and the apertures 36a, 36b, 37a, 37b causes the plate 34 to rotate (see arrow R-R in FIG. 2A) with respect to the body member 30. Rotational motion of the plate 34 provides the added benefit that the collinear electric and aerodynamic fluid flow field fields sweep over the entire machining area, thereby significantly enhancing the collection efficiency of the AEPC system 10.

Figure 4:
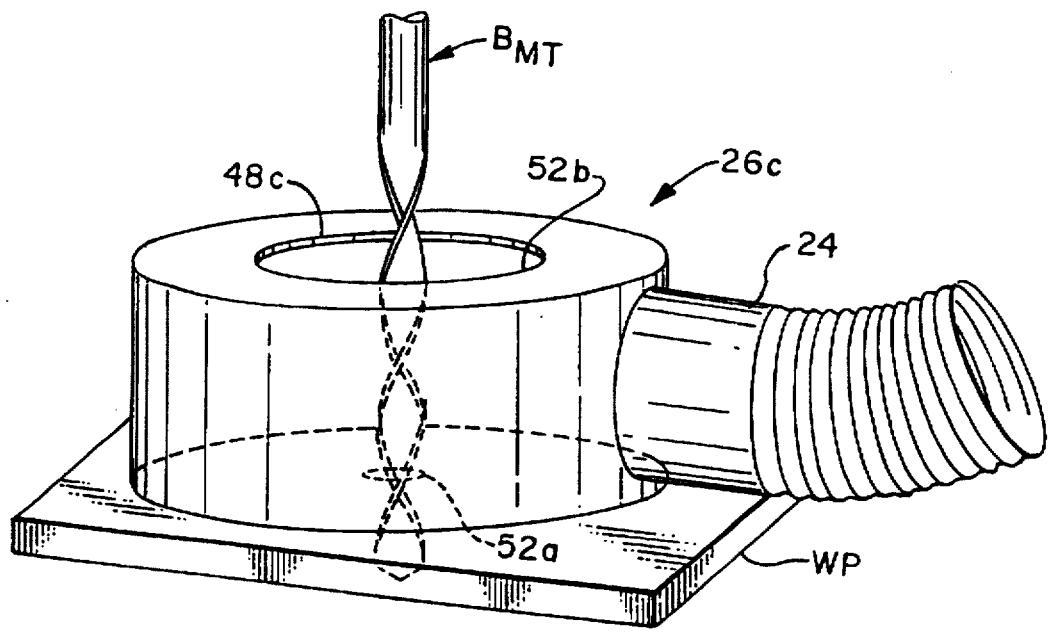
FIG. 4 illustrates still another embodiment of a nozzle configuration for the AEPC system according to the present invention.

Other exemplary nozzle configurations are illustrated in FIGS. 3, 4. FIG. 3 illustrates a removable shroud nozzle 26B configured for use in combination with hand-held machine tools MT such as drills, routers, milling tools, and cutting tools. The shroud nozzle 26B has a tapered configuration that is sized to fit onto the end of the machine tool MT (the shroud nozzle 26B may be removably held in place by any conventional mechanism such as a clamp Cl). The shroud nozzle 26B is fluidically coupled to the vacuum pump by means of the hose as described hereinabove. The collection electrode 48B for the shroud nozzle 26B is a wire having a spiral or helical configuration that is internally mounted at the inlet end of the shroud nozzle 26B. The shroud nozzle 26B is preferably fabricated from a rigid plastic material that is transparent to provide the operator with a relatively unobstructed view of the workpiece WP machining area.

FIG. 4 illustrates a collection cup nozzle 26C configured for use in combination with hand-held machine tools MT such as drills, routers, milling tools, and cutting tools having an extended bit $B_{MT}$. The collection cup nozzle 26C is configured to be overlayed on top of the workpiece WP. The collection nozzle 26C has a closed-ended cylindrical configuration that includes a first aperture 52b formed through one closed end thereof and a second aperture 52a formed through the other closed end thereof. The second aperture 52a is sized to allow the extended bit $B_{MT}$ to protrude therethrough to engage the workpiece WP. The collection cup nozzle 26C is fluidically coupled to the vacuum pump by means of the hose 24 as illustrated. The collection electrode 48C for the collection cup nozzle 26C is an annular plate that defines the first aperture 52b of the collection cup nozzle 26C. The collection cup nozzle 26C is preferably fabricated from a rigid plastic material that is transparent to provide the operator with a relatively unobstructed view of the workpiece WP machining area.

A variety of modifications and variations of the present invention are possible in light of the above teachings. It is therefore to be understood that, within the scope of the appended claims, the present invention may be practiced otherwise than as specifically described hereinabove.

What is claimed is:

1. An aerodynamic-electrostatic particulate collection system for high-efficiency collection of particulate debris generated in a machining area during machining of a workpiece, comprising:

a vacuum subsystem including means for generating a localized, vacuum-induced aerodynamic fluid flow field in the machining area during operation of said aerodynamic-electrostatic particulate collection system; and particulate charging, electric field generating means integrated in combination with the workpiece and said vacuum subsystem for charging the particulate debris generated during machining of the workpiece and for creating an electric field between the workpiece and said aerodynamic fluid flow field generating means that directs the charged particulate debris into the localized, vacuum-induced aerodynamic fluid flow field during operation of said aerodynamic-electrostatic particulate collection system;

the electric field created between the workpiece and said aerodynamic fluid flow field generating means being collinear with the localized, vacuum-induced aerodynamic fluid flow field created by said aerodynamic fluid flow field generating means wherein collection of particulate debris from the machining area is enhanced by said aerodynamic-electrostatic particulate collection system.

2. The aerodynamic-electrostatic particulate collection system of claim 1 wherein said vacuum subsystem comprises:

a vacuum pump;

a hose fluidically connected to said vacuum pump; and a nozzle fluidically connected to said hose distal said vacuum pump, said nozzle defining said aerodynamic fluid flow field generating means of said vacuum subsystem;

said nozzle being positioned with respect to the workpiece and having a configuration to develop the localized, vacuum-induced aerodynamic fluid flow field in the machining area.

3. The aerodynamic-electrostatic particulate collection system of claim 2 wherein said vacuum subsystem further includes a filtration device integrated in combination with said vacuum subsystem and operative to remove the particulate debris entrained in the aerodynamic fluid flow field.

4. The aerodynamic-electrostatic particulate collection system of claim 1 wherein said particulate charging, electric field generating means comprises:

a high voltage power supply;

a first conductive lead electrically interconnecting said high voltage power supply and the workpiece;

a collection electrode physically integrated in combination with said aerodynamic fluid flow field generating means of said vacuum subsystem; and a second conductive lead electrically interconnecting said high voltage power supply and said collection electrode;

the oppositely charged workpiece and said collection electrode in combination producing a corona discharge in the machining area that causes the particulate debris generated during machining of the workpiece to become charged;

the oppositely charged workpiece and said collection electrode in combination creating the electric field that is collinear with the localized, vacuum-induced aerodynamic fluid flow field.

5. The aerodynamic-electrostatic particulate collection system of claim 4 further comprising a current interrupter device that is operative to momentarily de-energize said collection electrode during operation of said aerodynamic-electrostatic particulate collection system.

6. The aerodynamic-electrostatic particulate collection system of claim 1 wherein said vacuum subsystem comprises a vacuum pump, a hose fluidically connected to said vacuum pump, and a nozzle fluidically connected to said hose distal said vacuum pump, said nozzle defining said aerodynamic fluid flow field generating means of said vacuum subsystem, said nozzle being positioned with respect to the workpiece and having a configuration to develop the localized, vacuum-induced aerodynamic fluid flow field in the machining area; and wherein said particulate charging, electric field generating means comprises a high voltage power supply, a first conductive lead electrically interconnecting said high voltage power supply and the workpiece, collection electrode physically integrated in combination with said nozzle of said vacuum subsystem, and a second conductive lead electrically interconnecting said high voltage power supply and said collection electrode;

the oppositely charged workpiece and said collection electrode in combination producing a corona discharge in the machining area that causes the particulate debris generated during machining of the workpiece to become charged;

the oppositely charged workpiece and said collection electrode in combination creating the electric field that is collinear with the localized, vacuum-induced aerodynamic fluid flow field.

7. The aerodynamic-electrostatic particulate collection system of claim 6 wherein said nozzle comprises:

a nozzle body having a cylindrical configuration that defines an internal channel, said nozzle body including an apertured attachment flange for mounting said nozzle in combination with a machine tool and an extension member for fluidically interconnecting said nozzle body to said hose; and a plate having a central aperture and first and second duct apertures mounted in rotatable combination with said nozzle body, said plate including a pair of ducts in fluid communication with said first and second duct apertures and extending downwardly from into the machining area adjacent the workpiece;

said collection electrode being formed as conductive plating bonded to walls that define said pair of ducts.

8. An aerodynamic-electrostatic particulate collection system for high-efficiency collection of particulate debris generated in a machining area during machining of a composite workpiece, comprising:

a vacuum subsystem that includes
a vacuum pump,
a hose fluidically connected to said vacuum pump, and
a nozzle fluidically connected to said hose distal said vacuum pump and operative to generate a localized, vacuum-induced aerodynamic fluid flow field in the machining area during operation of said aerodynamic-electrostatic particulate collection system; and a particulate charging, electric field generating means integrated in combination with the composite workpiece and said vacuum subsystem for charging the particulate debris generated during machining of the composite workpiece and for creating an electric field between the composite workpiece and said nozzle that directs the charged particulate debris into the localized, vacuum-induced aerodynamic fluid during operation of said aerodynamic-electrostatic particulate collection system, said particulate charging, electric field generating means including a high voltage power supply, a first conductive lead electrically interconnecting said high voltage power supply and the composite workpiece, a collection electrode physically integrated in combination with said nozzle of said vacuum subsystem, and a second conductive lead electrically interconnecting said high voltage power supply and said collection electrode;

the oppositely charged composite workpiece and said collection electrode in combination producing a corona discharge in the machining area the particulate debris generated during machining of the composite workpiece to become charged;

the electric field created between the composite workpiece and said collection electrode integrated in combination with said nozzle being collinear with the localized, vacuum-induced aerodynamic fluid flow field.

9. The aerodynamic-electrostatic particulate collection system of claim 8 wherein said nozzle comprises:

a nozzle body having a cylindrical configuration that defines an internal channel, said nozzle body including an apertured attachment flange for mounting said nozzle in combination with a machine tool and an extension member for fluidically interconnecting said nozzle body to said hose; and a plate having a central aperture and first and second duct apertures mounted in rotatable combination with said nozzle body, said plate including a pair of ducts in fluid communication with said first and second duct apertures and extending downwardly from into the machining area adjacent the composite workpiece;

said collection electrode being formed as conductive plating bonded to walls that define said pair of ducts.

* * * * *